United States Patent
Trudeau

(10) Patent No.: US 7,118,703 B2
(45) Date of Patent: Oct. 10, 2006

(54) HEAT DISSIPATION DEVICE FOR AND METHOD OF DISSIPATING HEAT FROM A NOZZLE

(75) Inventor: Robert Trudeau, Spartanburg, SC (US)

(73) Assignee: Mold-Masters Limited, Georgetown (CA)

(*) Notice: Subject to any disclaimer, the term of this patent is extended or adjusted under 35 U.S.C. 154(b) by 418 days.

(21) Appl. No.: 10/755,366

(22) Filed: Jan. 13, 2004

(65) Prior Publication Data
US 2004/0166194 A1    Aug. 26, 2004

Related U.S. Application Data

(60) Provisional application No. 60/448,146, filed on Feb. 20, 2003, provisional application No. 60/452,497, filed on Mar. 7, 2003.

(51) Int. Cl.
*B29C 45/20* (2006.01)
(52) U.S. Cl. .............. 264/328.14; 264/328.15; 425/547; 425/549
(58) Field of Classification Search ........... 425/549, 425/547; 264/328.14, 328.15
See application file for complete search history.

(56) References Cited

U.S. PATENT DOCUMENTS

| 4,439,915 | A | 4/1984 | Gellert |
| 4,557,685 | A | 12/1985 | Gellert |
| 4,648,546 | A | 3/1987 | Gellert |
| 4,688,622 | A | 8/1987 | Gellert |
| 5,125,827 | A | 6/1992 | Gellert |
| 5,360,333 | A | 11/1994 | Schmidt |
| 5,411,392 | A | 5/1995 | Von Buren |
| 6,447,283 | B1 | 9/2002 | Gellert |
| 6,936,199 | B1 * | 8/2005 | Olaru ............... 425/547 |
| 6,992,269 | B1 * | 1/2006 | Renwick et al. ....... 425/549 |

FOREIGN PATENT DOCUMENTS

| JP | 2002-331552 | 11/2002 |
| WO | WO 95/00312 | 1/1995 |
| WO | WO 03/80315 | 10/2003 |

OTHER PUBLICATIONS

S.L. Folkman et al., "Characterization of electroless nickel plating on aluminum mirrors," Proceedings of SPIE, Optomechanical Design and Engineering 2002, vol. 4771, p. 254, Jul. 7-9, 2002.
E.A. Wachter et al., "Remote Optical Detection Using Microcantilevers," Rev. Sci. Instrum. vol. 67, No. 10, pp. 3434-3439 (Oct. 1996).

* cited by examiner

*Primary Examiner*—Tim Heitbrink
(74) *Attorney, Agent, or Firm*—Sterne, Kessler, Goldstein & Fox PLLC

(57) ABSTRACT

An injection molding apparatus comprises a manifold having a manifold channel for receiving a melt stream of moldable material under pressure. A nozzle having a nozzle channel receives the melt stream from the manifold channel and delivers the melt stream through a mold gate to a mold cavity. The nozzle includes a nozzle head, a nozzle body and a nozzle tip. A heat dissipation device is coupled to the nozzle body at a location between the nozzle head and the nozzle tip to regulate the temperature of the nozzle and maintain it within a predetermined temperature range.

30 Claims, 14 Drawing Sheets

HEAT DISSIPATION DEVICE FOR AND METHOD OF DISSIPATING HEAT FROM A NOZZLE

CROSS-REFERENCE TO RELATED APPLICATIONS

This application claims priority to U.S. provisional patent application No. 60/448,146, filed Feb. 20, 2003, and U.S. provisional patent application No. 60/452,497, filed Mar. 7, 2003.

FIELD OF THE INVENTION

The present invention relates generally to an injection molding apparatus and, in particular, to a heat dissipation device and method for dissipating heat from the midsection of a nozzle.

BACKGROUND OF THE INVENTION

Prior art hot runner nozzles often have an uneven distribution of heat along the length thereof when operating in an injection molding apparatus. This uneven distribution of heat causes the temperature of the melt flowing through the nozzle to vary as it travels toward a mold cavity. Any variation in melt temperature can adversely affect the quality of the molded products and is therefore undesirable. The uneven heat distribution of the nozzle results from more heat being lost at the ends of the nozzle than at the midsection of the nozzle. FIGS. 1 and 2 illustrate this pattern of heat loss.

A prior art injection molding apparatus 100 is generally shown in FIG. 1. The injection molding apparatus includes a nozzle 102 that is mounted between a manifold 104 and a mold cavity plate 106. The nozzle 102 and manifold 104 are arranged such that melt flows from a manifold channel 108, through a nozzle channel 110 and into a mold cavity 112. The nozzle 102 contacts a cold mold plate 114 through spacers 116, which are provided between a nozzle head 118 and the mold plate 114, and seals 120, which are provided between a nozzle tip 122 and the mold plate 114. The nozzle 102 loses heat directly to the mold plate 114 through the spacers 116 and the seals 120. The midsection of the nozzle 102 is not in contact with any part of the mold plate 114 and, therefore, does not lose heat as quickly as the nozzle head 118 and the nozzle tip 122.

Another prior art hot runner nozzle 124 is shown in FIG. 2. The hot runner nozzle 124 screws into a manifold (not shown) and is located in a cavity 126 that is provided in a mold plate 128 of an injection molding apparatus. A heat profile of the nozzle 124 in an operating condition is also shown. The heat profile illustrates the temperature at each position along the length of the nozzle 124. As shown, the heat profile includes a temperature spike 130 that is generally located at the midsection of the nozzle 124. This occurs because there is more heat lost at the ends of the nozzle 124 due to contact with the manifold (not shown) and the cold mold cavity plate (not shown). The midsection of the nozzle 124 does not directly contact any part of the injection molding apparatus and therefore does not lose heat as rapidly as the ends of the nozzle 124.

Uneven heat distributions in nozzles are undesirable because with the increased use of more difficult to mold plastic materials, the melt must be maintained within narrower and narrower temperature ranges. If the temperature rises too high, degradation of the melt will result, and if the temperature drops too low, the melt will clog in the system and produce an unacceptable product. Both extremes can necessitate the injection molding apparatus being shut down for a clean out, which can be a very costly procedure due to the loss of production time.

In order to maintain the temperature of the melt flowing through the melt passage within a desired temperature window, it is known to provide less heat in areas where there is less heat loss, such as the midsection of the nozzle. One method of achieving this is to provide a variable pitch spiral channel in which a heating element is wound, as shown in FIGS. 1 and 2. This arrangement is also disclosed in the applicant's U.S. Pat. No. 4,557,685, which issued on Dec. 10, 1985, and which is incorporated in its entirety herein by reference. The pitch of the spiral channel is customized depending on the heating requirements of the particular molding application. While this improves the heat profile of the nozzle for many applications by reducing the magnitude of the temperature spike, it does not overcome the problem. In addition, this solution is relatively costly because nozzles must be custom made for specific applications.

A further disadvantage of an uneven temperature distribution along the length of a nozzle is that the nozzle is subjected to high stress due to the continuous cycling between higher and lower temperatures. This can result in a shorter nozzle life.

It is therefore an object of the present invention to provide a heat dissipation device for a nozzle that obviates or mitigates at least one of the above disadvantages.

SUMMARY OF THE INVENTION

According to the present invention there is provided an injection molding apparatus comprising a manifold having a manifold channel for receiving a melt stream of moldable material under pressure and a nozzle having a nozzle channel in communication with the manifold channel for receiving the melt stream from said manifold channel. The nozzle has a nozzle head and a nozzle tip. The injection molding apparatus also comprises a mold plate having a mold cavity and an opening into which the nozzle is inserted. According to one aspect of the present invention, the injection molding apparatus includes a heat dissipation device coupled to the nozzle at a location between the nozzle head and the nozzle tip. The heat dissipation device thermally expands and contacts the mold plate when a temperature of the nozzle increases above a predetermined temperature.

According to another aspect of the present invention, the injection molding apparatus comprises a nozzle heater coupled to the nozzle and a heat dissipation device coupled to the nozzle at a location between the nozzle head and the nozzle tip. The heat dissipation device has a first orientation when the nozzle has a temperature below a predetermined temperature and a second orientation when the nozzle has a temperature greater than a predetermined temperature. The first and second orientations differ in that the second orientation contacts the mold plate.

According to another aspect of the present invention there is provided method for dissipating heat from a nozzle, comprising providing a device made from at least one thermally expanding material having a first end and second end. The method includes coupling the first end of the device to the nozzle and positioning a second end of the device such that thermal expansion causes the device to come into contact with a cooler member when the temperature of the nozzle is heated to a predetermined temperature. The method includes heating the nozzle to greater than the predetermined temperature to actuate the heat dissipation device.

The present invention provides an advantage in that the heat profile of a nozzle can be evened out such that the temperature of the nozzle midsection is closer to the temperature of the ends of the nozzle. Further, temperatures can be controlled based on the specific thermally expansive nature of the materials of the heat dissipation device and without the use of additional controls or monitoring devices.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 3:
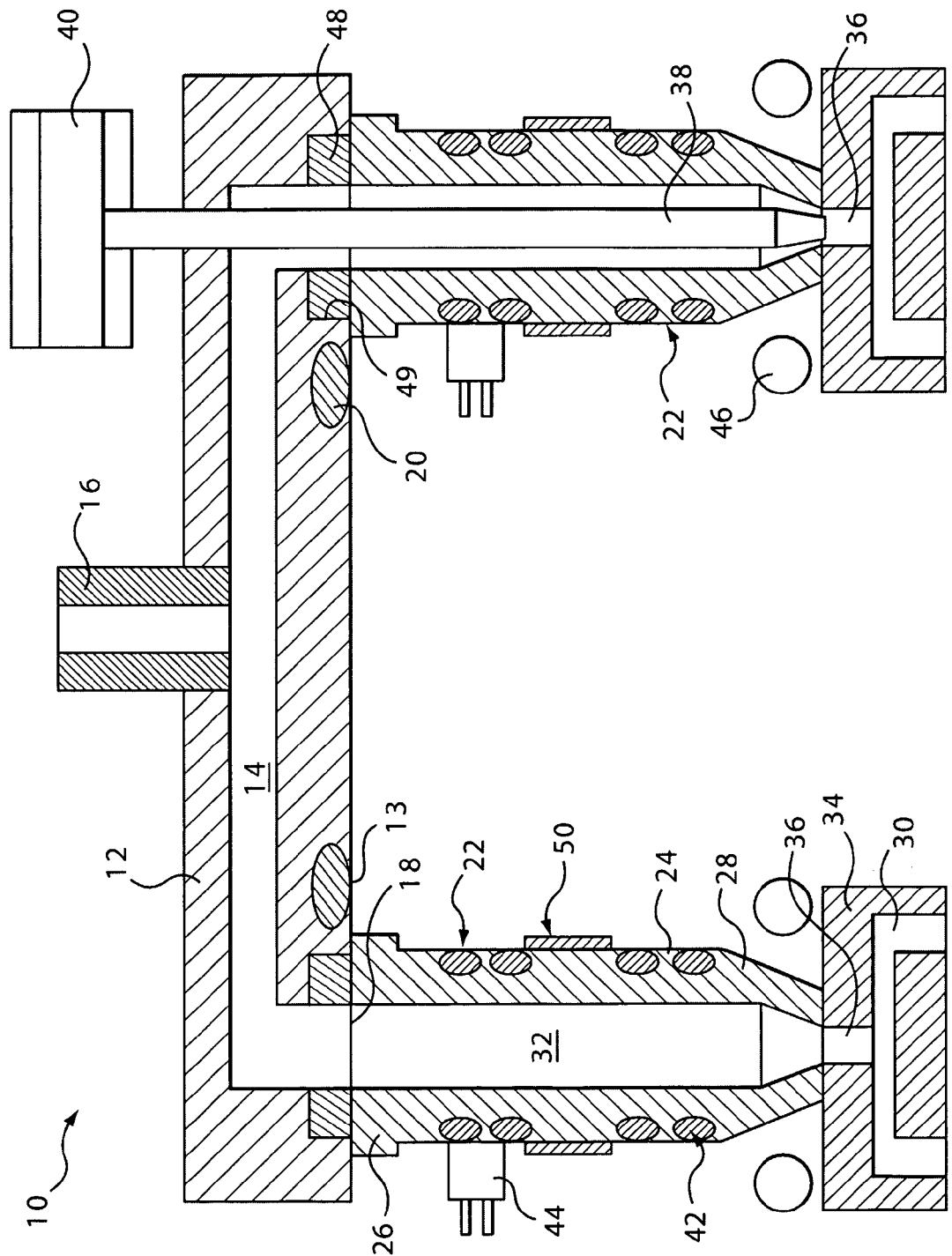
FIG. 3 is a side sectional view of an injection molding apparatus having a heat dissipation device according to an embodiment of the present invention.

Referring now to FIG. 3, an injection molding apparatus is generally indicated by reference numeral 10. The injection molding apparatus 10 comprises a manifold 12 having a manifold channel 14 extending therethrough. A manifold bushing 16 is located at an inlet of the manifold channel 14 to receive a melt stream of moldable material from a machine nozzle (not shown) and deliver the melt stream to manifold outlets 18. Manifold heaters 20 are provided in the manifold 12 to maintain the melt stream at a desired temperature.

Nozzles 22 are located between the manifold 12 and respective mold cavities 30, which are formed in mold cavity plates 34. A threaded end 48 of each nozzle 22 mates with a recess 49 provided in a lower surface 13 of the manifold 12. Each nozzle 22 includes a nozzle body 24 having a nozzle head 26 and a nozzle tip 28. The nozzle head 26 is shaped for engagement with a tool. A nozzle channel 32 extends through the nozzle 22 for delivering the melt stream from each manifold outlet 18 to the corresponding mold cavity 30.

Figure 2:
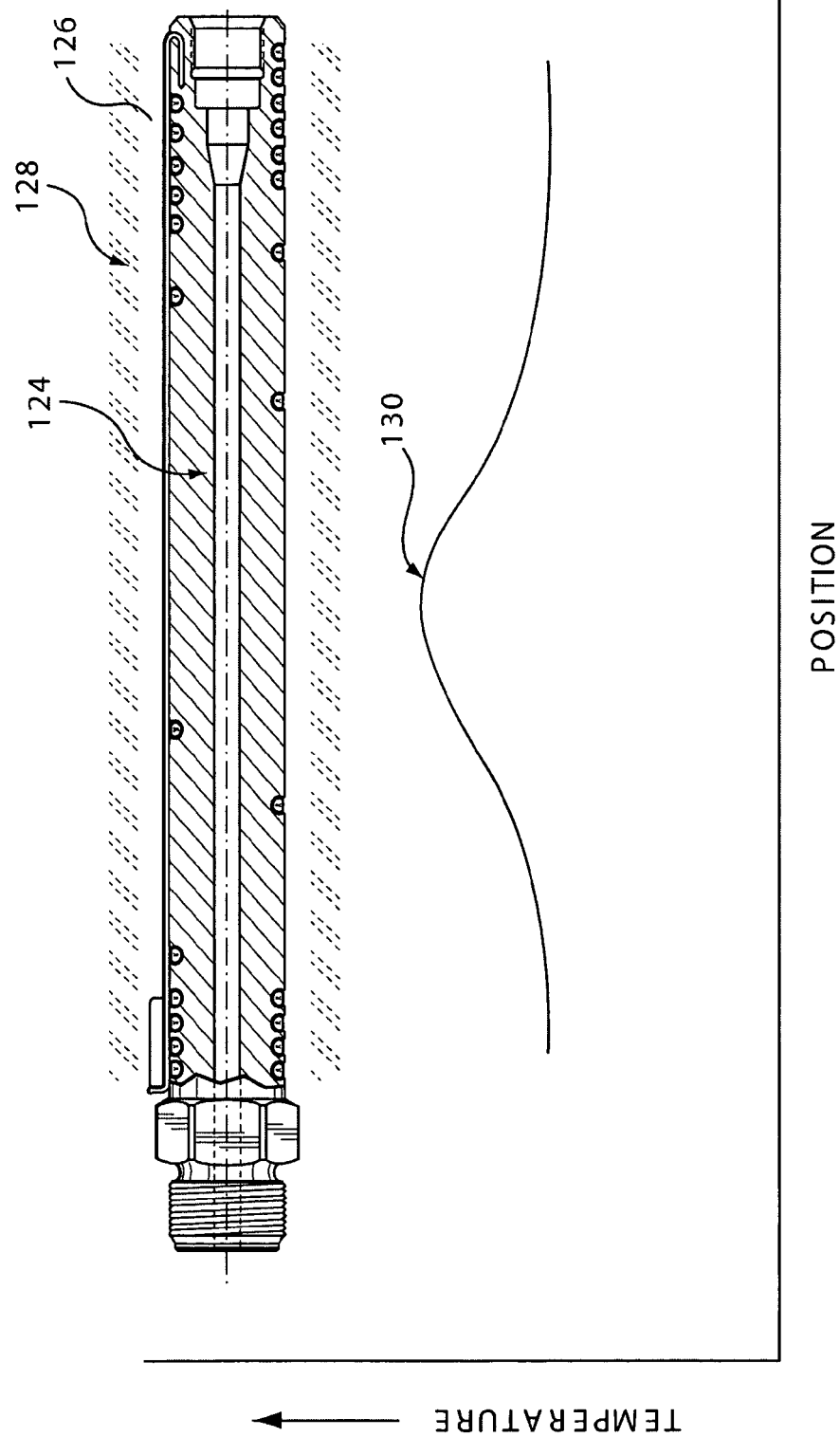
FIG. 2 is a prior art hot runner nozzle and a corresponding heat profile.

Mold gates 36 are provided at the entrance to the mold cavities 30. The mold gates 36 are selectively openable to allow melt to be delivered to the mold cavities 30. The nozzles 22 may be thermal gated (shown on the left of FIG. 2) or valve gated (shown on the right of FIG. 2). The valve gated nozzles 22 each include a valve pin 38 that is driven by a valve piston 40. Each valve pin 38 is selectively movable to open and close the respective mold gate 36.

Figure 4:
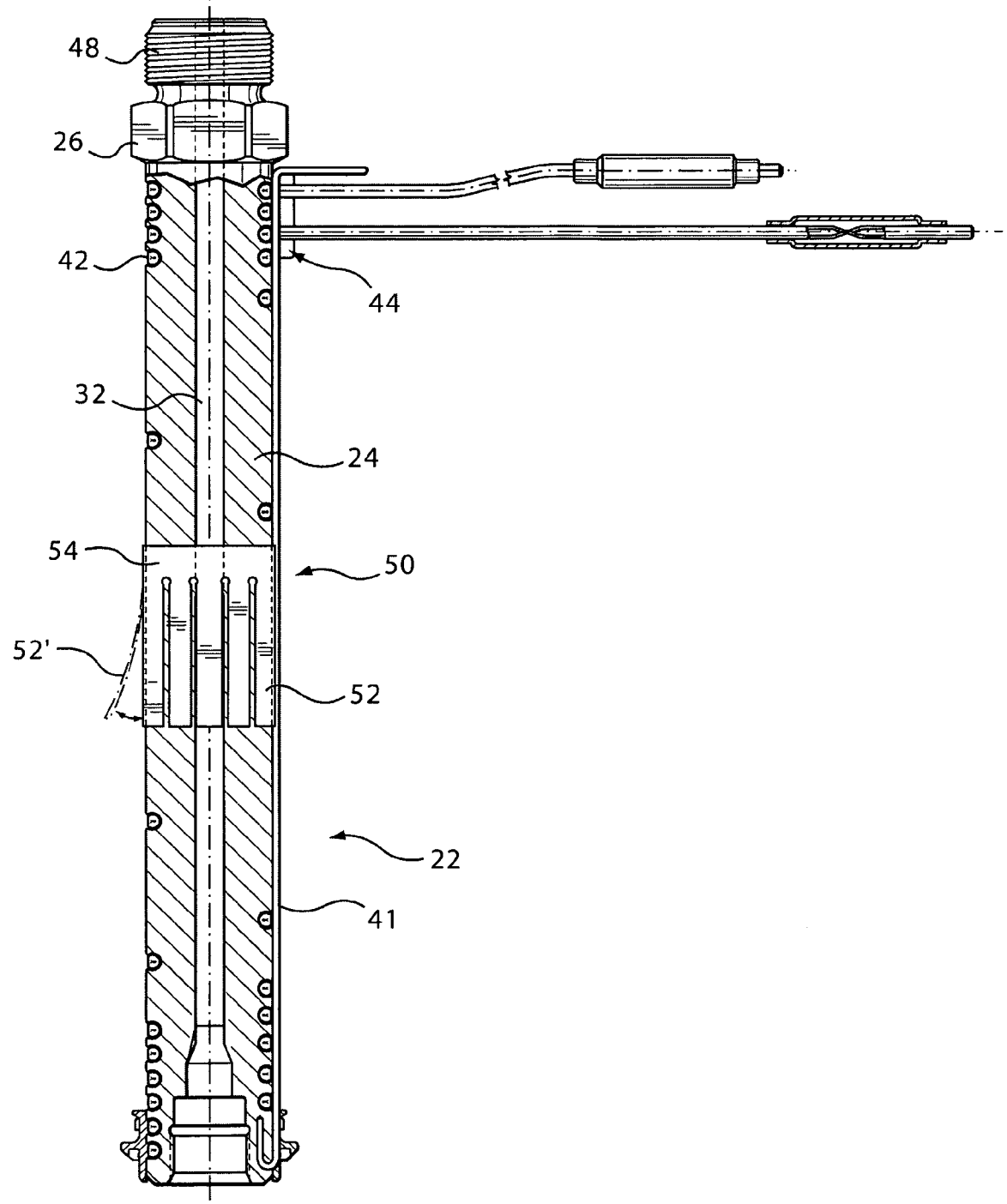
FIG. 4 is a side view partly in section of a nozzle of the injection molding apparatus of FIG. 3.
Figure 5:
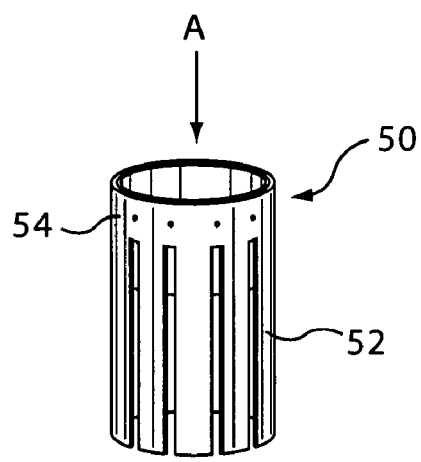
FIG. 5 is an isometric view of the heat dissipation device of FIG. 4.
Figure 6:
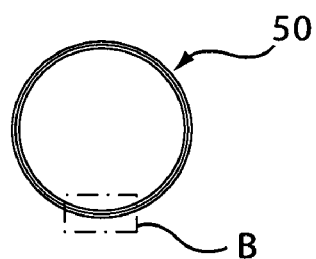
FIG. 6 is a planar view from a direction of aarow A of FIG. 5.

Each nozzle 22 is further provided with a heater 42, which helps to maintain the melt stream at a desired temperature as it passes through the nozzle 22. The heater 42 is powered through an electrical connector 44 that is in communication with a power source (not shown). The temperature of the nozzle is measured by a thermocouple 41 (shown in FIG. 4). More than one thermocouple may be used to monitor the temperature of the nozzle 22. To create an accurate heat profile of the nozzle 22, several thermocouples should be used. Another method for creating a heat profile of a nozzle 22 is to use an infrared camera, which is well known in the art. Cooling channels 46 are located adjacent the mold cavities 30 in order to aid in the cooling thereof.

In FIG. 3, heat dissipation devices 50 are coupled to each nozzle 22. As shown in the embodiments of FIGS. 4–12, the heat dissipation device 50 may be a sleeve having a plurality of fins 52 extending from a generally continuous band 54. In one embodiment of the heat dissipation device, the fins 52 are movable between a generally flat position in which the fins 52 lie against the nozzle body 24 and a curved position in which the fins 52 curve away from the nozzle body 24, as indicated by fin 52'. In the curved position the fins 52' contact a mold plate 25 (shown in FIG. 8), which surrounds the nozzle body 24. In an alternative embodiment, fins 52 may be pre-bent towards mold plate 25 so that less movement of fins 52', and thus less heat transfer from nozzle body 24, is required to contact mold plate 25.

Figure 7:
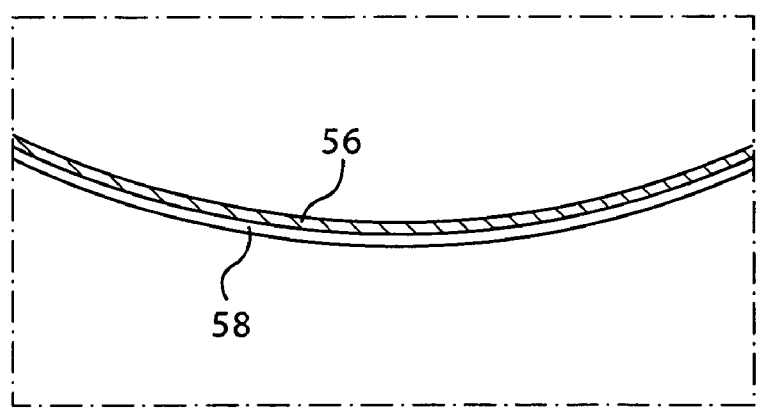
FIG. 7 is an enlarged view of portion B of FIG. 6.

Referring to FIG. 7, the heat dissipation device 50 includes an inner layer 56 and an outer layer 58. The inner layer 56 and outer layer 58 are coupled to one another by brazing, welding, soldering or a high temperature adhesive. The inner layer 56 is comprised of a material having a high coefficient of expansion and the outer layer 58 is comprised of a material having a low coefficient of expansion. Heating of the heat dissipation device 50 causes the fins 52 to curve away from the nozzle body 24 due to the difference in rates of expansion of the inner and outer layers 56, 58.

Suitable materials for the inner layer 56 include copper, copper alloys, aluminum, and aluminum alloys. Suitable materials for the outer layer 58 include titanium, titanium alloys, stainless steels, iron alloys, ceramics and fiberglass. In a preferred embodiment, the inner layer 56 is copper, or copper alloy, and the outer layer 58 is nickel. It will be appreciated by persons skilled in the art that any combination of materials can be used for the heat dissipation device 50 provided that the inner layer 56 has a higher coefficient of expansion than the outer layer 58.

The thickness of both the inner and outer layers 56, 58 is selected based on the desired thermal response characteristics for a particular application. The thickness of the layers 56, 58 is generally in the range of 0.01 inches to 0.125 inches.

The distance that the distal ends of the fins 52 move from the nozzle 22 between the generally flat position and the curved position can be controlled based on selection of materials for and selection of length of fin 52.

Figure 18:
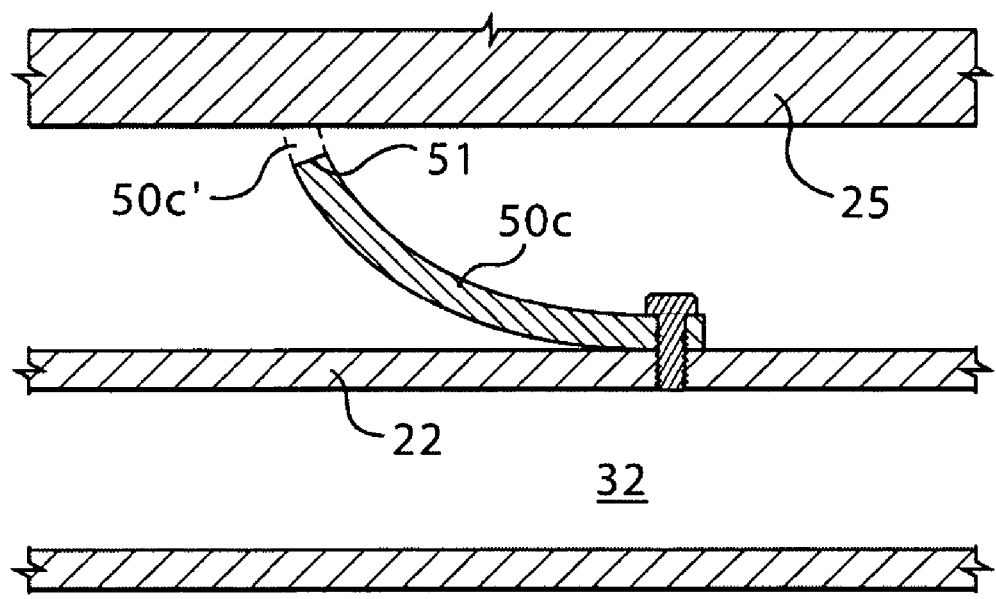
FIG. 18 is a partial side sectional view of an embodiment of the present invention.

The heat dissipation devices 50 are press fit onto the nozzles 22. Alternatively, the heat dissipation device 50 may be riveted (as seen in FIG. 18) to the nozzle 22 or attached in another way apparent to one skilled in the art.

In operation, the injection molding apparatus 10 is heated up from the cold condition, in which all of the components are at generally the same ambient temperature. The manifold 12 and the nozzle 22 are then maintained at their respective temperatures. Melt is injected from the machine nozzle into the manifold bushing 16 of the manifold 12. The melt flows through the manifold channel 14 into the nozzle channel 32 and is injected into the mold cavity 30. The melt is then cooled to produce finished molded parts.

Figure 8:
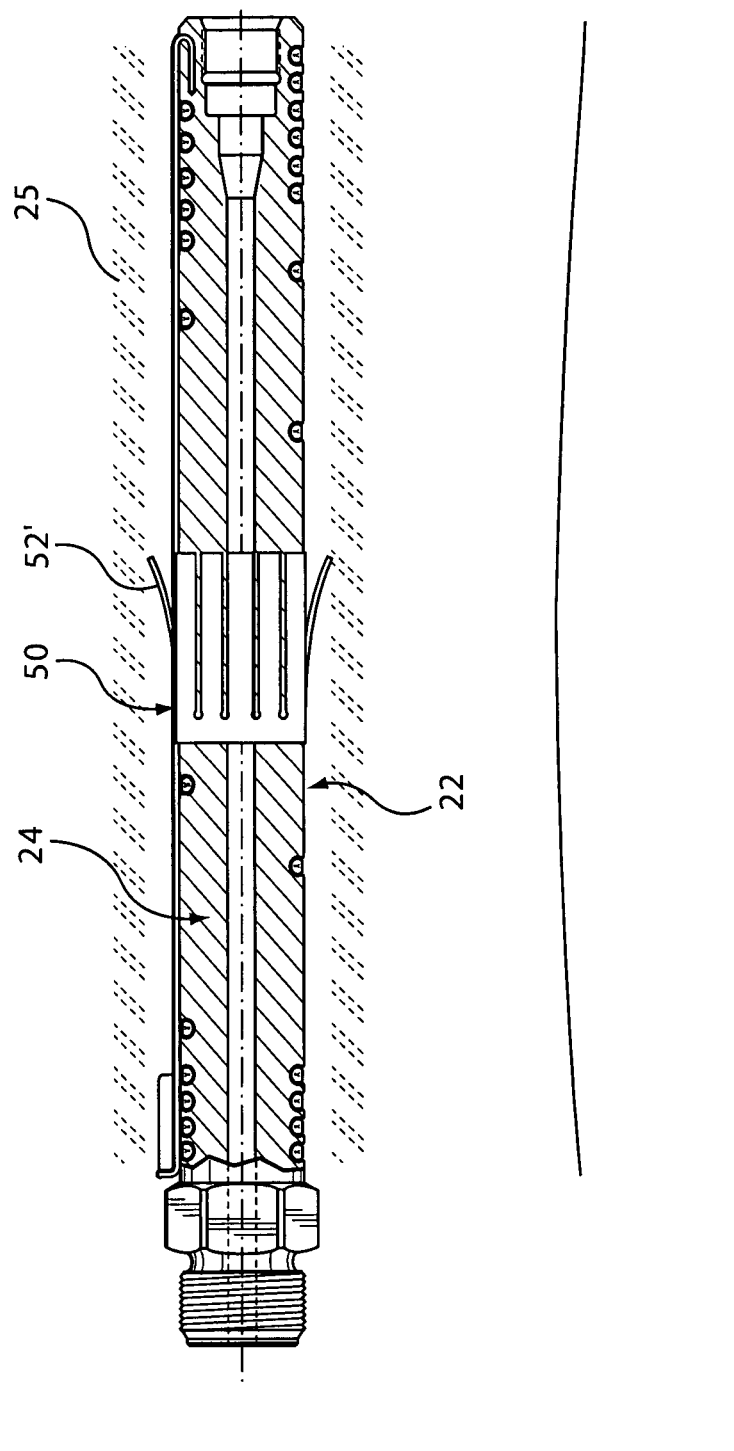
FIG. 8 is a side view of a nozzle with a heat dissipation device of the present invention and a corresponding heat profile.

Referring to FIG. 8, operation of the heat dissipation device 50 is illustrated. As the injection molding apparatus 10 is heated up from a cold condition, the temperature of the nozzle 22 increases. When the temperature of the nozzle 22 midsection has increased beyond a pre-determined value, the inner layer 56 of the heat dissipation device 50 begins to expand while the outer layer 58 expands at a slower rate. As the inner layer 56 expands, the fins 52 begin to curve away from the nozzle body 24, as indicated by fins 52' in FIGS. 4 and 8. The curved fins 52' contact the cold mold plate 25 (shown in FIG. 8) and heat is transferred from the curved fins 52' to the mold plate 25. The temperature at the midsection of the nozzle 22 then reduces in response to the heat transfer to the mold plate 25. The reduced temperature causes the inner layer 56 of the heat dissipation device 50 to shrink back to its original size and thus, the fins 52 return to the generally flat position.

Figure 1:
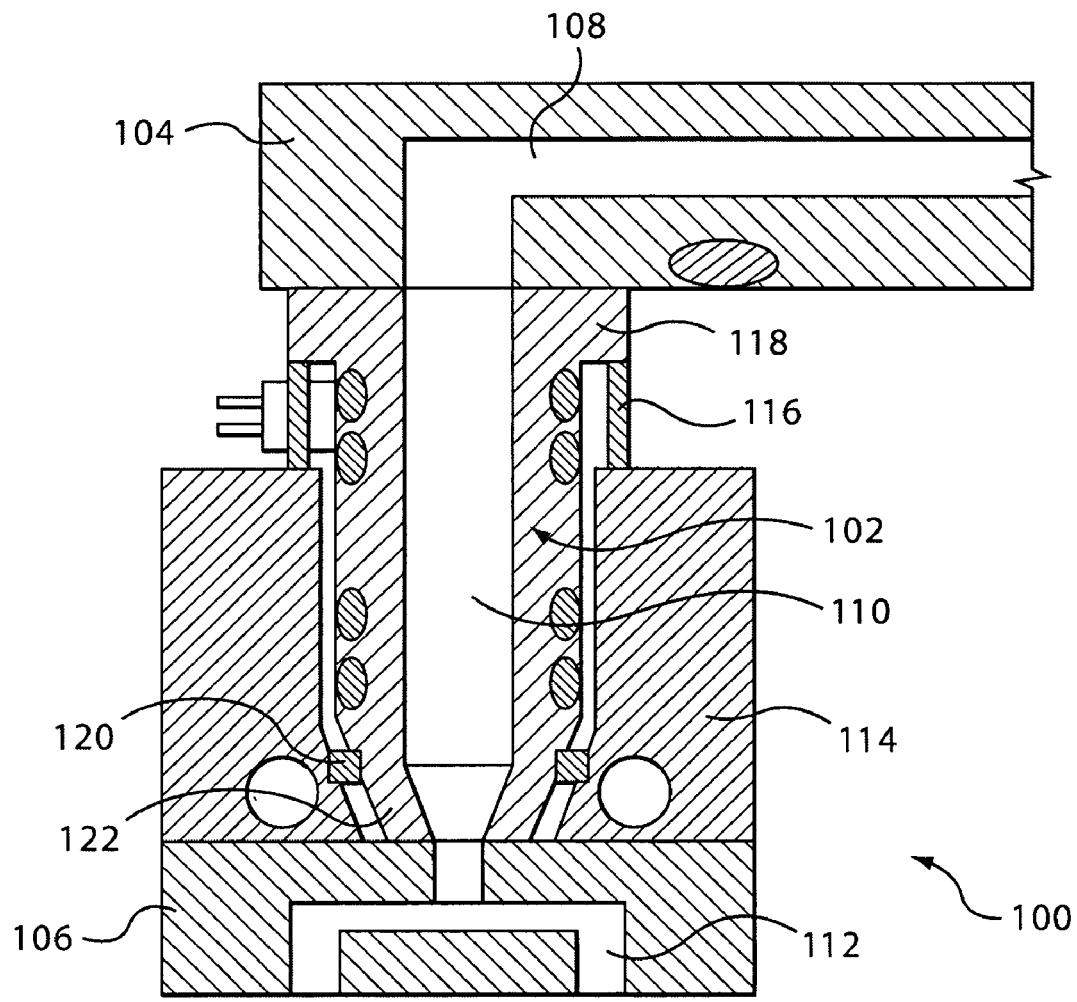
FIG. 1 is a portion of a prior art injection molding apparatus.

The fins 52 of the heat dissipation device 50 cycle between the generally flat position and the curved position to regulate the temperature of the nozzle 22 midsection. As shown in FIG. 8, the heat profile of the nozzle 22 with the heat dissipation device 50 is much flatter than the heat profile of FIG. 1, without the heat dissipation device 50. Each heat dissipation device 50 in the injection molding apparatus 10 operates independently and is self-regulating. Heat dissipation device 50 is actuated only by the addition of heat transferred from the nozzle 22 and is controlled based on the predetermined characteristics of the materials used to make the device. Thus, no other external controls or monitoring are necessary for the heat dissipation device to function.

In an injection molding apparatus having multiple nozzles, there is often a variation between the heat profiles of the nozzles. As has been discussed, in order to produce high quality molded parts, the temperature of each nozzle must be consistent within a narrow temperature range. Therefore, the actual amount that the temperature must be reduced may vary sizably from one nozzle to the next. The inner layer 56 of the fins 52 expands in response to the temperature of the nozzle 22 and facilitates heat loss when heat dissipation device reaches a predetermined nozzle operating temperature. If one nozzle reaches a higher temperature than another, the fins 52 of the heat dissipation device 50 will curve away from the nozzle and contact the mold plate 25 when the nozzle reaches the predetermined temperature. The heat dissipation device will remain in contact with the mold plate 25 for a longer period of time, if necessary, until the temperature of the nozzle falls below the predetermined temperature. Therefore, temperature sensitive behavior of the heat dissipation device 50 allows it to perform in response to the particular temperature of each nozzle, thus providing a relatively simple and inexpensive solution to a common injection molding problem.

It may alternatively be desirable to dissipate heat from the nozzle body 24 without direct contact between the mold plate 25 and the heat dissipation device 50 occurring. In this case, the material thickness and fin length are selected so that the distance that the fins 52 travel from the generally flat position to the curved position is less than the distance between the nozzle 22 and the mold plate 25. Heat is dissipated to the air from the increased surface area of the fins 52 when they are in the curved position.

Figure 9:
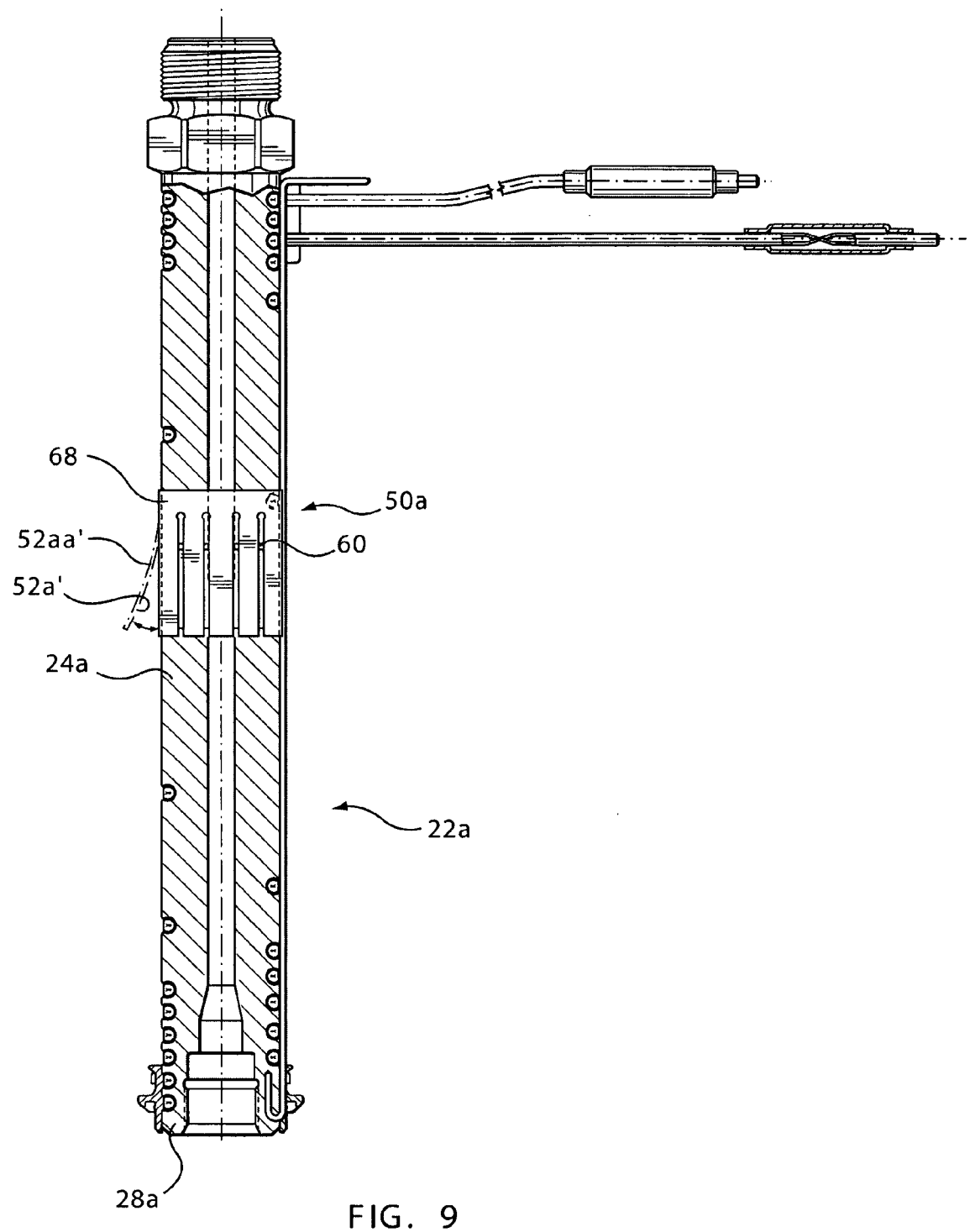
FIG. 9 is a side view partly in section of another embodiment of the present invention.
Figure 10A:
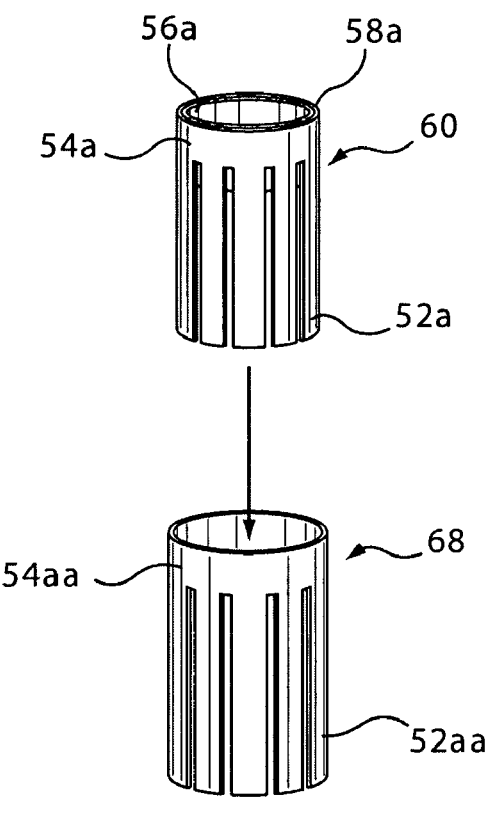
FIG. 10A is an exploded view of the heat dissipation device of FIG. 9.
Figure 10B:
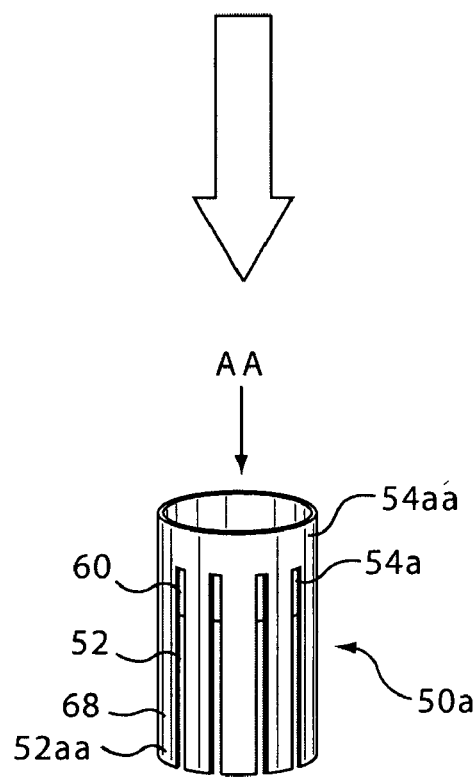
FIG. 10B is an isometric view of the heat dissipation device of FIG. 10A.
Figure 11:
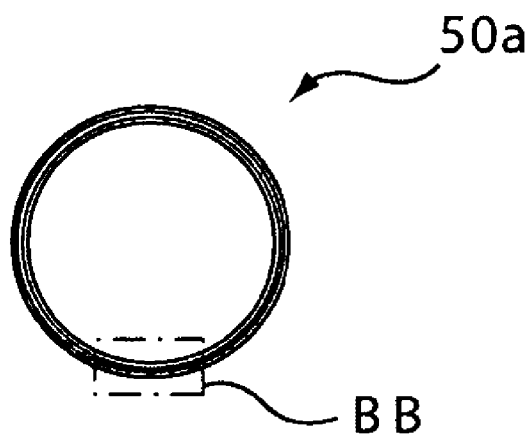
FIG. 11 is a planar view from a direction of aarow AA of FIG. 10B.
Figure 12:
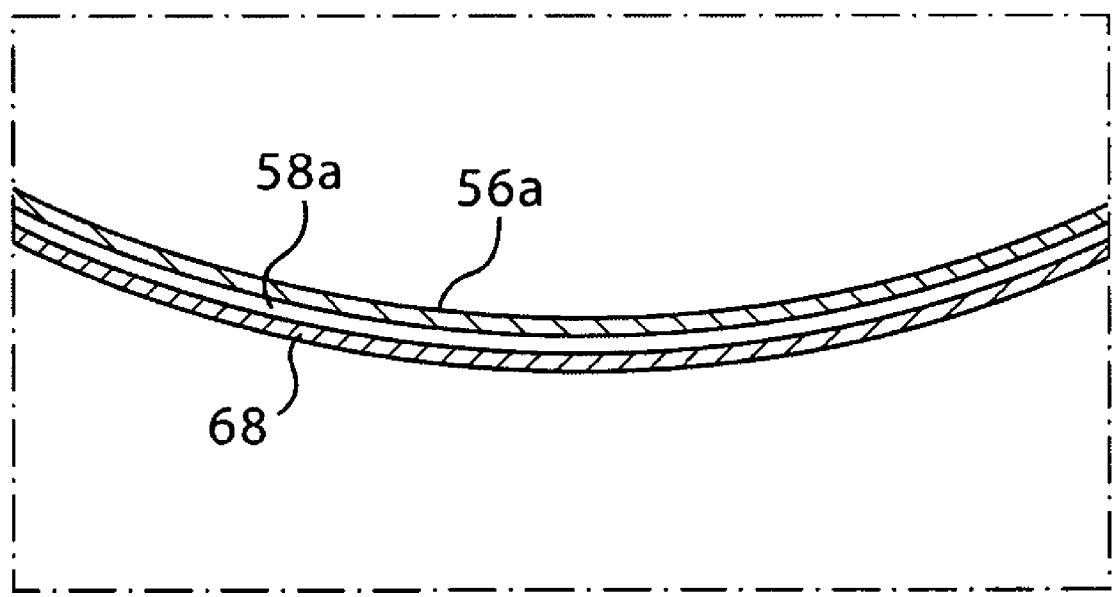
FIG. 12 is an enlarged view of portion BB of FIG. 11.

Referring to FIG. 9 another embodiment of a heat dissipation device 50a mounted on a nozzle 22a is shown. As shown in FIGS. 9–12, the heat dissipation device 50a includes an inner sleeve 60 and an outer sleeve 68. The inner sleeve 60 includes a plurality of fins 52a that extend from a generally continuous band 54a. The inner sleeve 60 comprises an inner layer 56a, which is comprised of a material having a high coefficient of expansion, and an outer layer 58a, which is comprised of an insulating material. The inner layer 56a and outer layer 58a may be secured to one another by brazing, soldering or a high temperature adhesive. The fins 52a of the inner sleeve 60 curve away from nozzle body 24a when heated, as indicated by fin 52a', in a similar manner as the fins 52 of heat dissipation device 50.

Suitable materials for the inner layer 56a include copper, copper alloys, aluminum, and aluminum alloys. Suitable insulating materials for the outer layer 58a include ceramic, resin, fiberglass, epoxy and steel.

The outer sleeve 68 surrounds the inner sleeve 60 and is secured thereto by brazing, soldering, welding or a high temperature adhesive. The outer sleeve 68 includes fins 52aa that extend from a generally continuous band 54aa. The fins 52aa of the outer sleeve 68 extend further toward nozzle tip 28a than the fins 52a of the inner sleeve 60 and may also be longer that the fins 52a of the inner sleeve 60. The outer sleeve 68 is generally thinner than the inner sleeve 68 so as not to hinder the curving motion of the fins 52a of the inner sleeve 60.

The outer sleeve 68 is comprised of a material having a high rate of thermal conductivity. Suitable outer sleeve 68 materials include copper, copper alloys, aluminum, and aluminum alloys. The outer sleeve 68 material and the inner layer material 56a may be the same.

The outer sleeve 68 may, alternatively, be completely separate from the inner sleeve 60. The fins 52aa may further be corrugated.

In operation, when the temperature of the midsection of the nozzle 22a increases beyond a predetermined value, the inner layer 56a of the inner sleeve 60 expands. This expansion causes the fins 52a of the inner sleeve 60 to move away from the nozzle body 24a from a generally flat position toward a curved position. As the fins 52a move away from the nozzle body 24a, they cause the fins 52aa of the outer sleeve 68 to move with them. The fins 52a and 52aa continue to curve away from the nozzle 22a until the fins 52aa', shown in FIG. 9, contact the mold plate. When in contact, the fins 52aa of the outer sleeve 68 insulate the fins 52a of inner sleeve from direct contact with the mold plate. The outer sleeve 68 thus operates as a damper so that heat loss from the nozzle 22a midsection via the inner sleeve 60 is gradual. This ensures that fins 52a of the inner sleeve 60 do not oscillate rapidly between the curved and generally flat positions.

Figure 13:
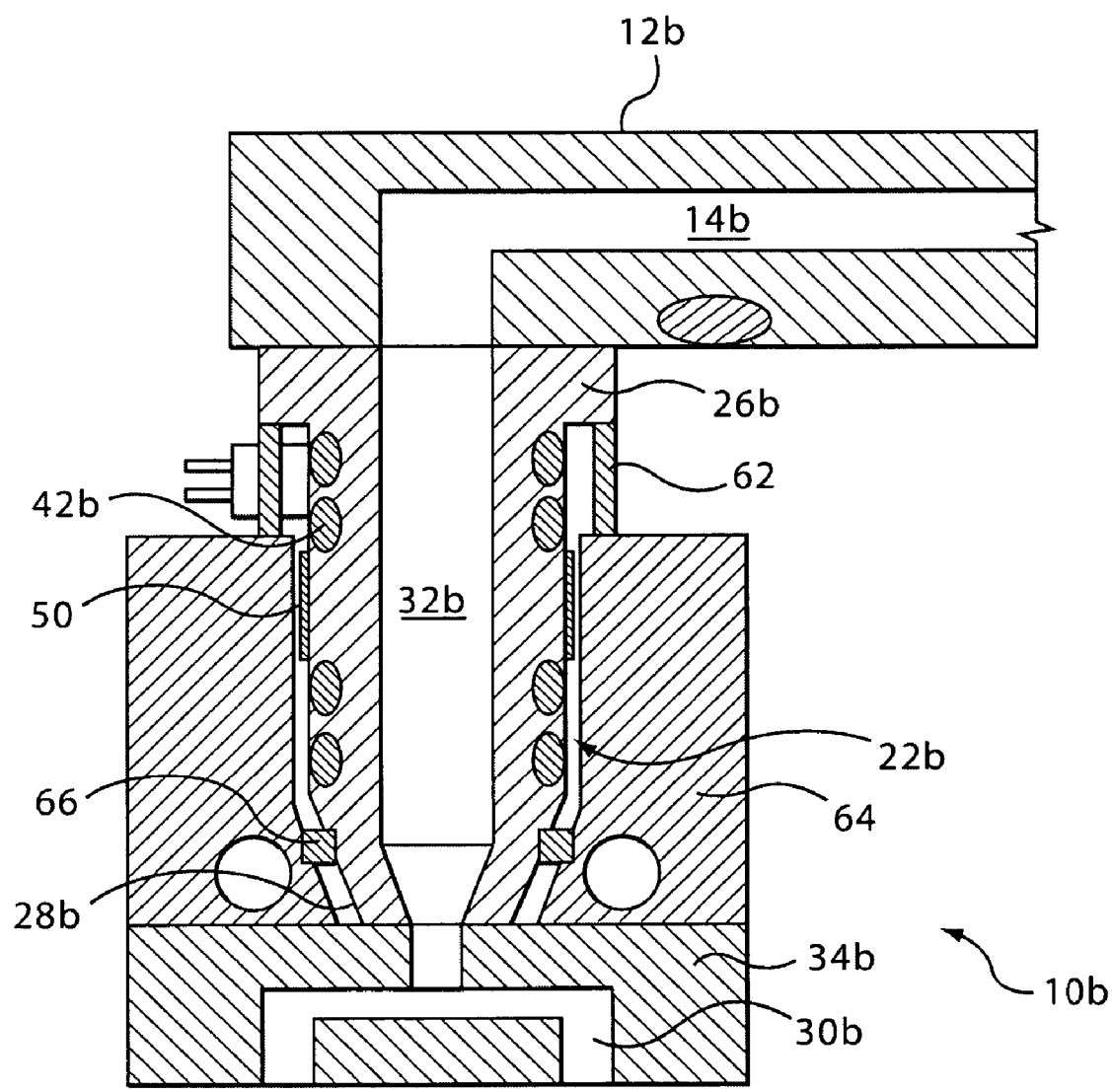
FIGS. 13, 14 and 15 are side sectional views of further embodiments of the present invention.

Another embodiment of an injection molding apparatus 10b is shown in FIG. 13. In this embodiment, a nozzle 22b having a nozzle head 26b and a nozzle tip 28b is mounted between a manifold 12b and a mold cavity plate 34b. The nozzle 22b and manifold 12b are arranged such that melt flows from a manifold channel 14b, through a nozzle channel 32b and into a mold cavity 30b. Spacers 62 separate the nozzle head 26b from a mold plate 64 and seals 66 are provided between the nozzle tip 28b and the mold plate 64.

A heating element 42b is embedded in a variable pitch spiral channel in the nozzle 22b. A heat dissipation device 50 is mounted on the nozzle 22b. The heat dissipation device 50 is similar to the heat dissipation device that has been described in relation to FIGS. 3 to 8. It will be appreciated that the heat dissipation device 50b may be used with any type of nozzle.

Figure 14:
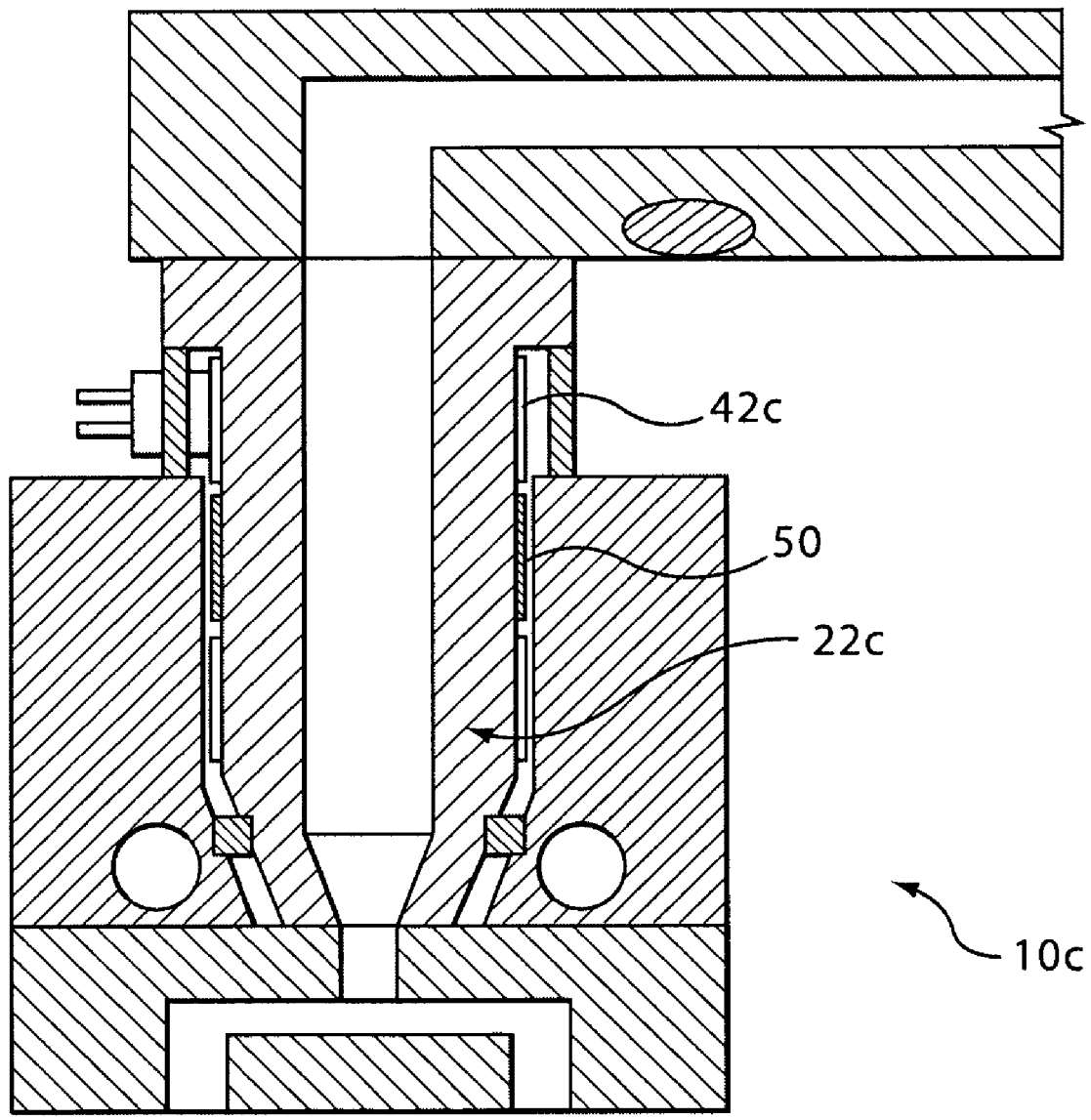
Figure 15:
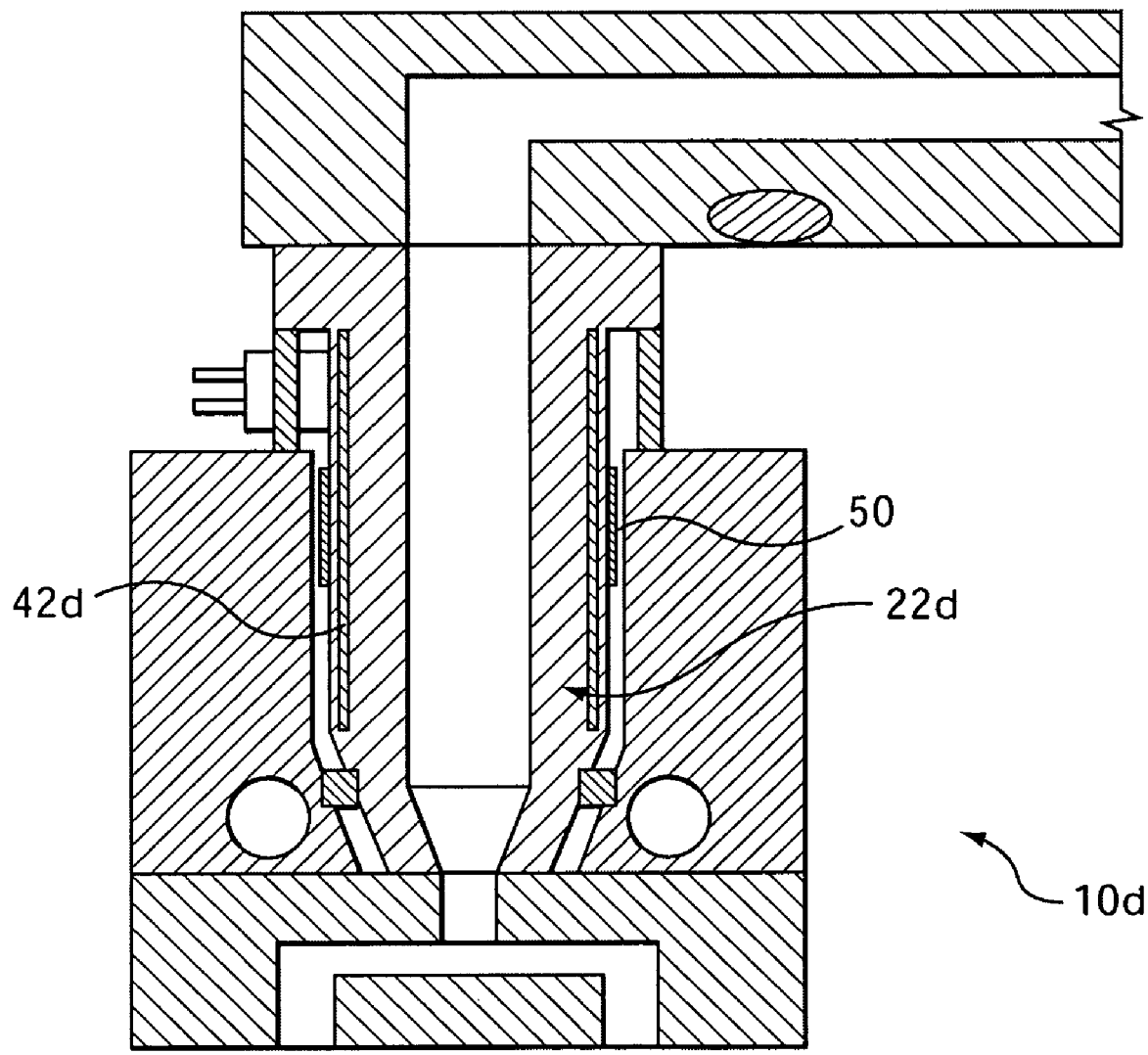

FIGS. 14 and 15 show a heat dissipation device 50 of the present invention being used with different types of nozzle heaters. The injection molding apparatus 10c of FIG. 14 includes cartridge heaters 42c that are coupled to nozzle 22c. The injection molding apparatus 10d of FIG. 15 includes a heater 42d that is embedded in nozzle 22d. Persons skilled in the art will appreciate that the heat dissipation device may also be used with nozzles having film heaters or any other suitable nozzle heater.

The heat dissipation device 50 of the previous embodiments may additionally be provided with a slit in the band 54 so that the device 50 is not continuous about the nozzle circumference. In addition, it will be appreciated by persons skilled in the art that the cross section of the heat dissipation device may have any shape to allow for mating with nozzles having various shaped cross sections.

Figure 16:
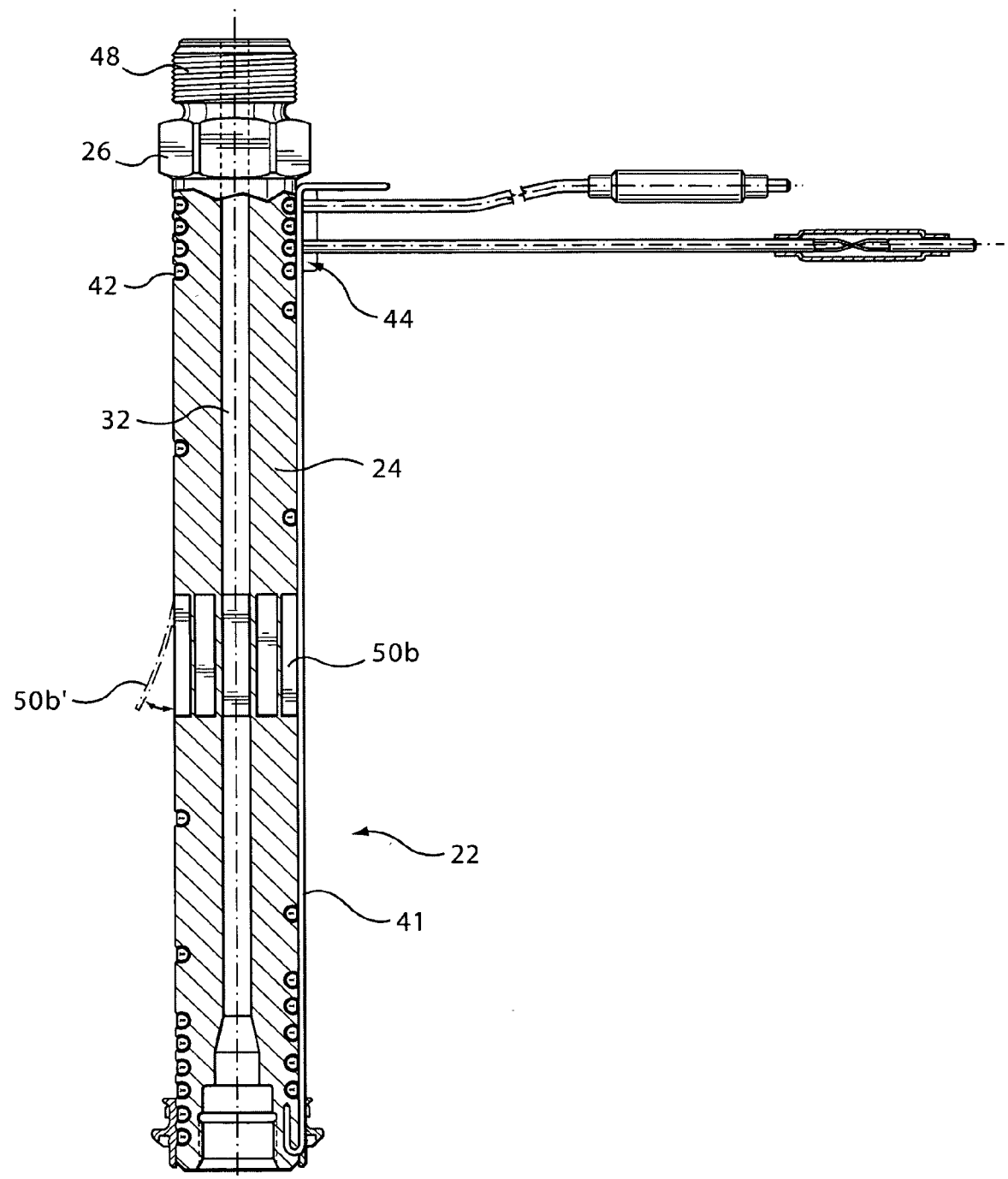
FIG. 16 is a side view partly in section of another embodiment of the present invention.

Further, band 54 may be eliminated altogether. For example, heat dissipation device may be one or more rectangular or alternatively shaped members having a first end coupled to nozzle 22 and a second end capable of coming into contact with a mold plate. In FIG. 16, nozzle 22 has a plurality of heat dissipation devices 50b positioned around its middle portion. Upon introduction of heat from nozzle 22, each heat dissipation device 50b' will contact the mold plate 25 when the temperature of the nozzle at the location to which it is attached reaches a predetermined temperature.

Alternatively, fewer heat dissipation devices 50b or even a single heat dissipation device 50b may be coupled to nozzle 22. Heat dissipation devices 50b may be spaced in a variety of ways along nozzle body 24 to best remove heat from nozzle 22. A heat dissipation device in accordance with the present invention may be larger or smaller than heat dissipation devices 50b shown in FIG. 16 provided that as the temperature of the nozzle increases, the heat dissipation device will touch the mold plate 25.

Figure 17:
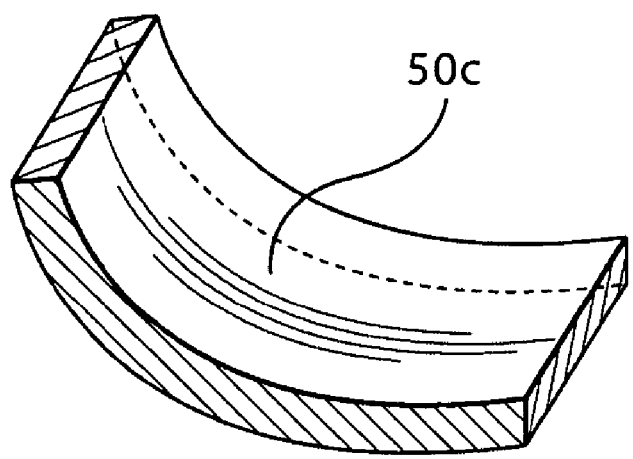
FIG. 17 is a side sectional view of another heat dissipation device of the present invention.

FIGS. 17 and 18 show yet another embodiment of the present invention. Heat dissipation device 50c shown in cross section in FIG. 17 is made of a thermally conductive material and is bent into a curved shape. As shown in FIG. 18, heat dissipation device 50c is riveted to nozzle 22 and is bent so that an end 51 is close to, but not touching mold plate 25 when no heat is being applied to the nozzle 22. However, once nozzle 22 reaches a predetermined temperature, the heat is transferred into heat dissipation device 50c, which causes heat dissipation device 50c to thermally expand until it touches mold plate 25 (shown as 50c' in FIG. 18). Once heat dissipation device 50c' is touching mold plate 25, the heat from nozzle 22 is transferred into mold plate 25 sinking the heat from and lowering the temperature of nozzle 22. Once nozzle 22 returns to less than the predetermined temperature, the heat dissipation device 50c no longer thermally expands to the point where it touches mold plate 25.

Heat dissipation device 50c may be of any material that thermally expands, provided that end 51 of heat dissipation device 50c expands enough to contact the mold plate 25 at a predetermined temperature. Further, heat dissipation device 50f may be positioned in any way apparent to one skilled in the art to achieve contact with the mold plate 25 at the predetermined temperature.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus, comprising:
   a manifold having a manifold channel for receiving a melt stream of moldable material under pressure;
   a nozzle having a nozzle channel in communication with said manifold channel for receiving the melt stream from said manifold channel, said nozzle having a nozzle head and a nozzle tip;
   a mold plate having a mold cavity and an opening into which said nozzle is inserted; and
   a heat dissipation device coupled to said nozzle at a location between said nozzle head and said nozzle tip wherein said heat dissipation device is spaced from the mold plate when a temperature of said nozzle is below a predetermined temperature; and
   wherein said heat dissipation device thermally expands and contacts said mold plate when a temperature of said nozzle is above the predetermined temperature.

2. The injection molding apparatus as claimed in claim 1, wherein said heat dissipation device comprises a band having a plurality of fins extending therefrom, wherein said band is fixed to said nozzle.

3. The injection molding apparatus as claimed in claim 1, wherein said heat dissipation device comprises a first end and a second end, wherein said first end is fixed to said nozzle.

4. The injection molding apparatus as claimed in claim 3, wherein said heat dissipation device comprises a second end bent towards said mold plate prior to heating said nozzle.

5. The injection molding apparatus as claimed in claim 4, wherein said heat dissipation device is comprised of only one thermally expandable material.

6. The injection molding apparatus as claimed in claim 4, wherein said heat dissipation device comprises a first material and a second material, wherein said first material has a different coefficient of thermal expansion than said second material.

7. The injection molding apparatus as claimed in claim 6, wherein both said first and said second materials are metals.

8. The injection molding apparatus as claimed in claim 1, wherein said heat dissipation device includes a first layer that is directed toward an outer surface of said nozzle body and a second layer adjacent to said first layer.

9. The injection molding apparatus as claimed in claim 8, wherein said first layer has a greater coefficient of thermal expansion than said second layer.

10. The injection molding apparatus as claimed in claim 9, wherein said first layer is selected from the group consisting of copper, copper alloys, aluminum, and aluminum alloys.

11. The injection molding apparatus as claimed in claim 9, wherein said second layer is selected from the group consisting of titanium, titanium alloys, stainless steels, iron alloys, ceramic and fiberglass.

12. The injection molding apparatus as claimed in claim 9, wherein said heat dissipation device is bi-metallic.

13. The injection molding apparatus as claimed in claim 8, further comprising a third layer adjacent said second layer on a side of said second layer opposite of said first layer.

14. The injection molding apparatus as claimed in claim 13, wherein said first and third layers are made from materials having a higher coefficient of thermal expansion than said second layer.

15. The injection molding apparatus as claimed in claim 14, wherein said second layer is made from an insulating material.

16. The injection molding apparatus as claimed in claim 1, further comprising a plurality of heat dissipation devices coupled to said nozzle between said nozzle head and said nozzle tip.

17. An injection molding apparatus, comprising:
a manifold having a manifold channel for receiving a melt stream of moldable material under pressure;
a nozzle having a nozzle channel in communication with said manifold channel for receiving the melt stream from said manifold channel, said nozzle having a nozzle head and a nozzle tip;
a nozzle heater coupled to said nozzle;
a mold plate having a mold cavity and an opening into which said nozzle is inserted; and
a heat dissipation device coupled to said nozzle at a location between said nozzle head and said nozzle tip, said heat dissipation device having a first spatial orientation spaced from the mold plate when said nozzle is at a temperature below a predetermined temperature and a second spatial orientation when said nozzle is at a temperature greater than the predetermined temperature, wherein said first and second orientations differ in that said second orientation contacts said mold plate.

18. The injection molding apparatus as claimed in claim 17, wherein said heat dissipation device comprises a first layer and a second layer, wherein said first layer is closer to said nozzle than said second layer and said first layer is a material having a greater coefficient of thermal expansion than said second layer.

19. The injection molding apparatus as claimed in claim 17, wherein said heat dissipation device is bent toward said mold plate prior to introducing heat to said nozzle.

20. A heat dissipation device for use in an injection molding apparatus, comprising:
one or more layers of material, each layer having a first end and a second end, wherein said first end is coupled to a nozzle, said heat dissipation device having a first spatial orientation spaced from an adjacent mold plate when the nozzle is at a temperature below a predetermined temperature and a second orientation when the nozzle is at a temperature greater than the predetermined temperature, wherein said first and second orientations differ in that said second orientation includes said second end in contact with said adjacent mold plate.

21. The heat dissipation device as claimed in claim 20, wherein said heat dissipation device is bent away from said nozzle.

22. The heat dissipation device as claimed in claim 20, further comprising a first layer directed towards an outer surface of said nozzle body and a second layer adjacent to said first layer.

23. The heat dissipation device as claimed in claim 22, wherein said first layer has a greater coefficient of thermal expansion than said second layer.

24. The heat dissipation device as claimed in claim 23, further comprising a third layer adjacent said second layer on a side of said second layer opposite of said first layer, wherein said third layer has a greater coefficient of thermal expansion than said second layer.

25. A method of dissipating heat from a nozzle of an injection molding apparatus, comprising:
providing a heat dissipation device made from at least one thermally expanding material having a first end and second end;
coupling said first end to said nozzle of said injection molding apparatus;
positioning a second end of said device such that thermal expansion causes said second end to come into contact with a cooler member when said nozzle is heated to a predetermined temperature; and
heating said nozzle to greater than said predetermined temperature.

26. The method of claim 25, further comprising bending said second end away from said nozzle and towards said cooler member.

27. The method of claim 25, wherein said cooler member is a mold plate.

28. A method of dissipating heat from a nozzle of an injection molding apparatus, comprising:
providing an injection molding nozzle;
providing a mold plate adjacent but not contacting said injection molding nozzle;
providing a heat dissipation device having a first end and a second end;
coupling said first end to said injection molding nozzle;
directing heat away from said nozzle by allowing said heat dissipation device to thermally expand and come into contact with said mold plate when said nozzle temperature increases beyond a predetermined temperature.

29. The method of dissipating heat from a nozzle as claimed in claim 28, further comprising bending said heat dissipation device away from said nozzle and towards said mold plate.

30. The method of dissipating heat from a nozzle as claimed in claim 28, wherein said heat dissipation device comprises a first layer directed towards an outer surface of said nozzle body and a second layer adjacent to said first layer, said first layer having a greater coefficient of thermal expansion than said second layer.

* * * * *